US006839705B1

(12) United States Patent
Grooters

(10) Patent No.: US 6,839,705 B1
(45) Date of Patent: *****Jan. 4, 2005

(54) METHOD FOR DELIVERING AND CACHING PREPROCESSED SEARCH RESULTS TO IMPROVE PERFORMANCE OF BACKGROUND INFORMATION SEARCHES ON A CONVERGENCE DEVICE

(75) Inventor: Brandon A. Grooters, Bedford, TX (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1021 days.

(21) Appl. No.: 09/021,362

(22) Filed: Feb. 10, 1998

(51) Int. Cl.[7] ............................................. G06F 17/30
(52) U.S. Cl. ...................... 707/4; 707/104.1; 709/215; 725/87; 345/721
(58) Field of Search .................. 707/1–6, 10, 104.1, 707/501, 513; 709/217, 218, 215; 455/2, 5.1, 3.1, 3.2, 3.3, 4.1; 348/6, 7, 10, 13; 345/327, 721; 725/47, 50, 87; 380/20, 211

(56) References Cited

U.S. PATENT DOCUMENTS

| | | | | |
|---|---|---|---|---|
| 5,617,565 A | * | 4/1997 | Augenbraun et al. .......... | 707/4 |
| 5,630,119 A | * | 5/1997 | Aristides et al. ............... | 707/1 |
| 5,798,785 A | * | 8/1998 | Hendricks et al. ............. | 348/1 |
| 5,801,747 A | * | 9/1998 | Bedard .......................... | 348/1 |
| 5,861,906 A | * | 1/1999 | Dunn et al. .................... | 348/7 |
| 5,878,223 A | * | 3/1999 | Becker et al. ............... | 709/215 |
| 5,926,207 A | * | 7/1999 | Vaughan et al. ............. | 348/13 |
| 6,003,041 A | * | 12/1999 | Wugofski ................ | 707/104.1 |
| 6,005,561 A | * | 12/1999 | Hawkins et al. ............ | 345/327 |
| 6,005,565 A | * | 12/1999 | Legall et al. ................ | 345/327 |
| 6,025,837 A | * | 2/2000 | Matthews, III et al. ...... | 345/327 |
| 6,028,599 A | * | 2/2000 | Yuen et al. .................. | 345/327 |
| 6,072,521 A | * | 6/2000 | Harrison et al. .............. | 348/12 |
| 6,075,526 A | * | 6/2000 | Rothmuller .................. | 345/327 |
| 6,081,263 A | * | 6/2000 | LeGall et al. ................ | 345/327 |
| 6,137,549 A | * | 10/2000 | Rasson et al. .............. | 348/906 |

OTHER PUBLICATIONS

"Information Caching for Delivery of Personalized Video Programs on Home Entertainment Channels," Papdimitriou et al., Proceedings of the 1994 International Conference on Multimedia Computing and Systems, May 15–19, 1994, IEEE, pp. 214–223.*

"The Fishwrap Personalized News System," Chesnais et al., MIT Media Laboratory, Proceedings of the Second International Workshop on Community Networking, 1995, Integrated Multimedia Services to the Home, Jun. 20–22, 1995, pp. 275–28.*

* cited by examiner

Primary Examiner—Shahid Alam
(74) Attorney, Agent, or Firm—Scott Charles Richardson; William J. Breen, III; Suiter-West

(57) ABSTRACT

A method and apparatus for providing viewer specific program information is described. A user of an integrated personal computer and television convergence device requests specific programming information from a remote server using an electronic program guide. The remote server performs a database search based upon the requested information and caches the results of the database search in a local storage device. The database search result information is viewer specific and appended to or integrated with the requested electronic program guide. Advanced searching techniques may be utilized to manipulate and filter the searched information to maintain the viewer specific integrity thereof. The database search result information is thereby provided to the client or convergence device along with the requested programming information. The database search result information thereby supplements and augments the viewing experience of the viewer.

64 Claims, 6 Drawing Sheets

METHOD FOR DELIVERING AND CACHING PREPROCESSED SEARCH RESULTS TO IMPROVE PERFORMANCE OF BACKGROUND INFORMATION SEARCHES ON A CONVERGENCE DEVICE

BACKGROUND OF THE INVENTION

The present invention generally relates to the field of information handling systems, and more particularly to a method and system for retrieving, caching and delivering information based upon a information request in a computer-based information handling system.

Traditionally, the television and the computer have been considered separate appliances each having its own infrastructure and applications. Although the computer has been a common fixture in the home for several decades, the television and the computer have not been integrated beyond the utilization of an extra household television as a low quality composite video monitor. The television has been utilized for receiving unidirectional, passive, non-interactive programming from an oligopoly of programming sources via an analog transmission signal. Television viewers in the past could only get advance programming information from extra-television sources such as a newspaper or program guide magazine. Information was limited to date, channel, time and a brief, generic summary of the programming information. The introduction of cable television with its greater channel capacity and bandwidth brought improved programming information such as a preview channel which lists dedicated programming information (i.e. for a particular cable company). However, this information is still limited in depth and in time. Further, the programming information remains generic to all viewers and is delivered in a scrolling format that merely provides serial access to the information.

Computer-based information handling systems provide powerful and efficient collection, processing and storage of information. Computer-based systems further provide the advantage of operation in the digital domain that allows data to be processed, filtered and manipulated. Although the cathode ray tube is a significant component of both the computer and the television, only recently have both the computer and television been combined into a single integrated unit. The integration of the television and the personal computer has been referred to as the PC-TV, or convergence device. The combination of computer and television was sparked at least in part by the conceptualization of the Internet and the World Wide Web function as a means to "broadcast" programming content on demand, and by the economic advantages of a single appliance performing the functions of both appliances. The PC-TV further provides a higher quality, non-interlaced video signal than standard broadcast television signals and the capability to receive and demodulate high definition digital broadcast signals (e.g., HDTV) in the event digital broadcasting is implemented as a national standard.

It would be therefore highly desirable to provide programming information to each individual viewer via an information network such as the Internet that is specifically tailored in scope, in time of delivery and access, and in content according to the interests and profiles of each viewer. Thus, there lies a need for an electronic program guide intended for use on an information handling system such as a personal computer and television convergence device wherein the electronic program guide contains customized, viewer-specific programming information instead. There further lies a need for an electronic program guide capable of providing supplemental information to the viewer along with the customized programming information wherein the supplemental information is obtained from a database search via an information network.

SUMMARY OF THE INVENTION

Accordingly, it is a goal of this invention to provide a method for providing viewer specific programming information and related supplemental information for television and integrated television and personal computer type appliances.

The present invention is directed to a method and information handling system for delivering data base search results in conjunction with an information request wherein the information request is for an electronic program guide. In one embodiment, the method includes the steps of receiving a request for information from a remote device, wherein the information contains predetermined content, performing a search of a database based upon the predetermined content of the information whereby a database search result is obtained, and delivering the database search result along with the information to the remote device. Further, the invention is directed to a computer readable medium whose contents cause a computer to perform the method steps for delivering data base search results in conjunction with an information request.

The present invention provides access to information about a television program or event in addition to the information available on an electronic program guide. The information may be automatically obtained without the need for performing a manual search.

The present invention provides an enhancement, or added value, to normal electronic program guide information. Additional information on individual and specific electronic television program listings is obtained, for example, by performing an Internet search on all or selected programs, the results of which may be cached for later reference and downloading.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
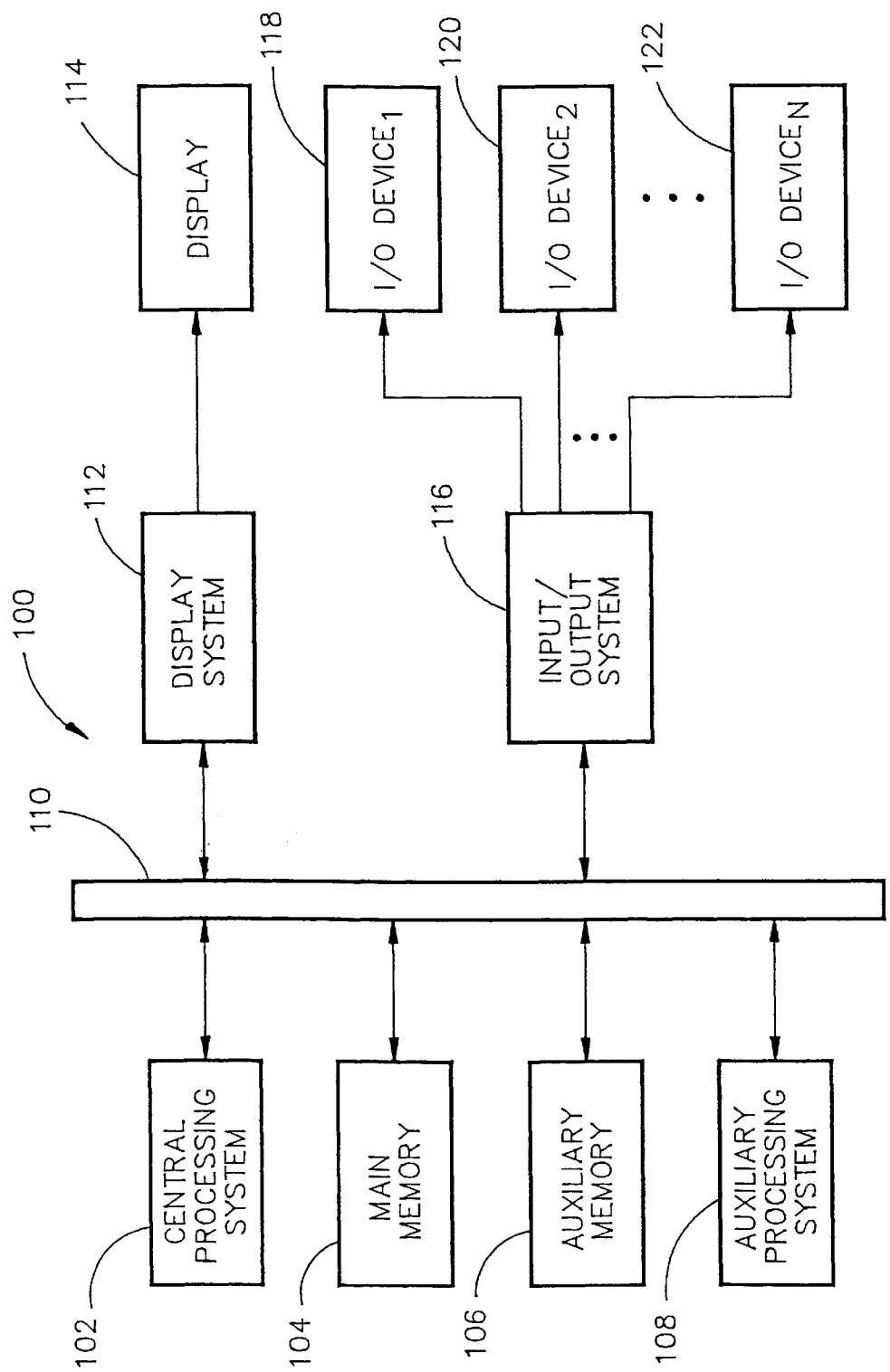
FIG. 1 is a block diagram of a hardware system in accordance with the present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, auxiliary memory 106, and an auxiliary processing system 108 as required. The main memory 104 provides storage of instructions and data for programs executing on the central processing system 102. The main memory 104 is typically semiconductor based memory such as dynamic random access memory (DRAM) and or static random access memory (SRAM). The auxiliary memory 106 provides storage of instructions and data that are loaded into the main memory 104 before execution. The auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 100 further includes a display system 112 for connecting to a display device 114, and an input/output (I/O) system 116 for connecting to one or more I/O devices 118, 120 up to N number of I/O devices 122. The display system 112 may comprise a video display adapter having all of the components for driving the display device, including video random access memory (VRAM), buffer, and graphics engine as desired. The display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between the one or more I/O devices 118–122. For example, the input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 116 and I/O devices 118-122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
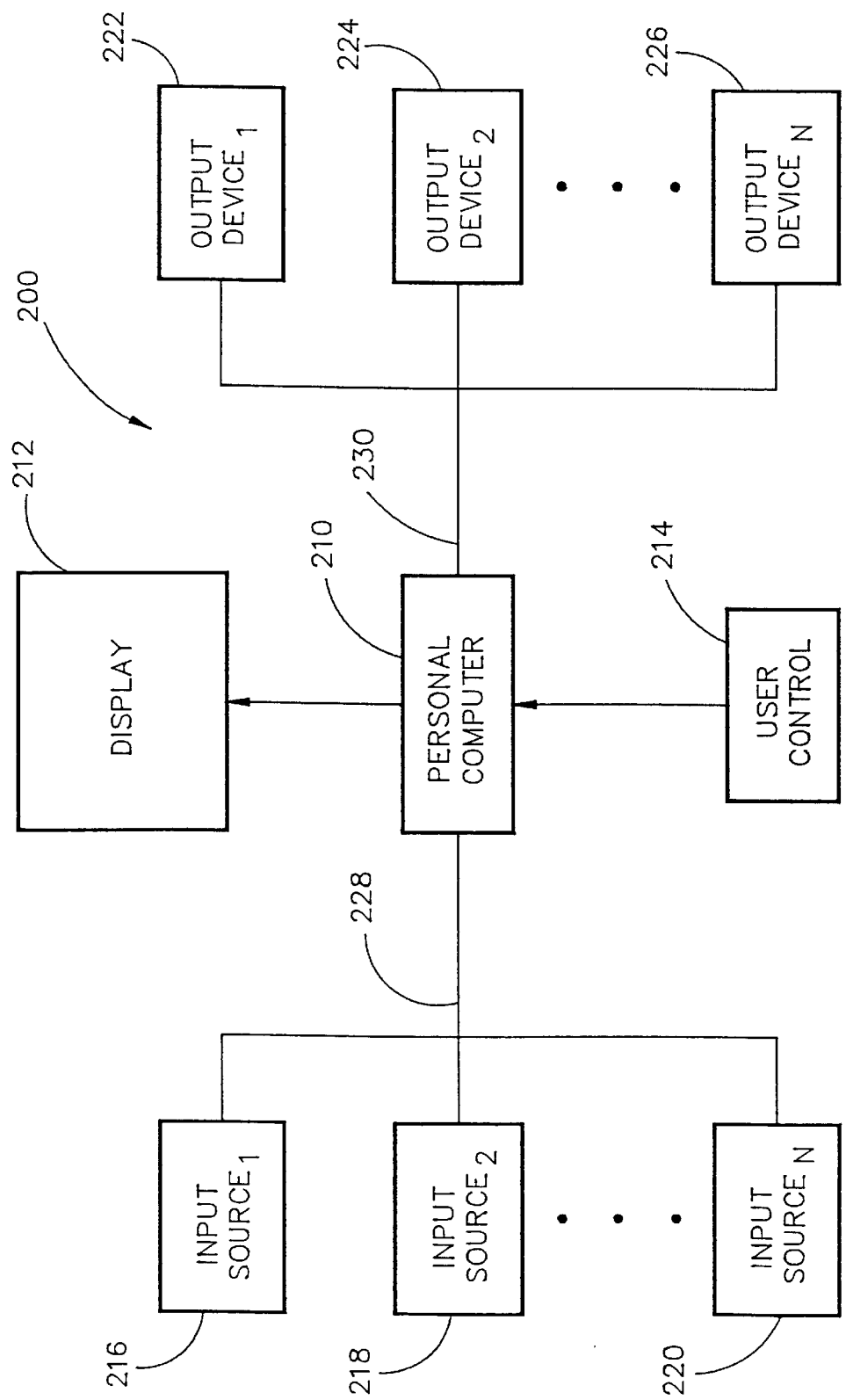
FIG. 2 is a conceptual block diagram of an integrated television and personal computer convergence device.

Referring now to FIG. 2, an integrated television and personal computer convergence device is shown. The convergence device 200, also referred to as a PC-TV, comprises a personal computer 210 as a central control device. Video information is displayed on a display device 212 which is preferably a high resolution (VGA or greater) computer type cathode ray tube (CRT) monitor. Alternatively, the display 212 may comprise a flat screen liquid-crystal display such as an active matrix, supertwisted nematic display or a plasma based display. The personal computer 210 receives one or more input signals from one or more input sources such as input sources 216, 218 and 220. Likewise, the personal computer provides one or more output signals to one or more output devices such as output devices 222, 224 and 226. One of ordinary skill would appreciate the fact that a single peripheral device may simultaneously function as an input source and as an output device thereby providing bi-directional data communications. For example, a modem may be operatively connected to the personal computer and function as an input source and an output device by both sending and receiving signals to and from a remotely disposed computer connected to the personal computer via the modem. A user of the convergence PC-TV device 200 may control the PC-TV via a user control device 214 which operatively communicates with the personal computer 210. For example, the user control device 214 may be a hand-held remote control device similar to a standard television remote control using infrared data communications. The convergence PC-TV device 200 may be a home entertainment system combining a complex processor with a high quality display as described in U.S. Pat. No. 5,675,390. Said U.S. Pat. No. 5,675,390 is hereby incorporated by reference in its entirety. Further, the user control device 214 may be an adjustable power remote control drive as described in U.S. Pat. No. 5,650,831. Said U.S. Pat. No. 5,650,831 is hereby incorporated by reference in its entirety.

The input sources and output devices shown in FIG. 2 may be any of various external electronic devices or systems. For example, the personal computer 228 may be connected to the Internet via a modem or codec for connections to the Internet, for file transfer protocol, Telnet, gopher, Usenet, or e-mail connections. The external connections may be implemented according to any one of various available communications protocols such as public telephone network (PTN), public switched telephone network (PSTN), subrate digital loop (SRDL), digital subscriber line (DSL), asymmetric digital subscriber line (ASDL), frame relay, asynchronous transfer mode (ATM), Ethernet, Fibre Channel, integrated services digital network (ISDN), cable modem, cellular, personal communications services (PCS), radio-frequency (RF) twin lead or coaxial cable, transmission control protocol/Internet protocol (TCP/IP), serial line Internet protocol/point to point protocol (SLIP/PPP), local area network (LAN) or wide area network (WAN) type communications, or the like. Further, the input sources and output devices may comprise one or more types of peripheral devices such as a video gaming console, VCR, compact disc player, video laser disc player, digital versatile disk (DVD) player, rewritable digital versatile disk (DVD+RW) player, audio processor, audio amplifier, surround sound or AC-3 type processor, etc. Further, the personal computer 210 may be connected to one or more computer peripheral type devices such as a CD-changer, disk drive, mouse or similar type of input device, scanner, video or audio input devices (e.g., camera), keyboard, large capacity storage media (magnetic, optical, floptical, or the like), modem, or another computer, for example.

Figure 3:
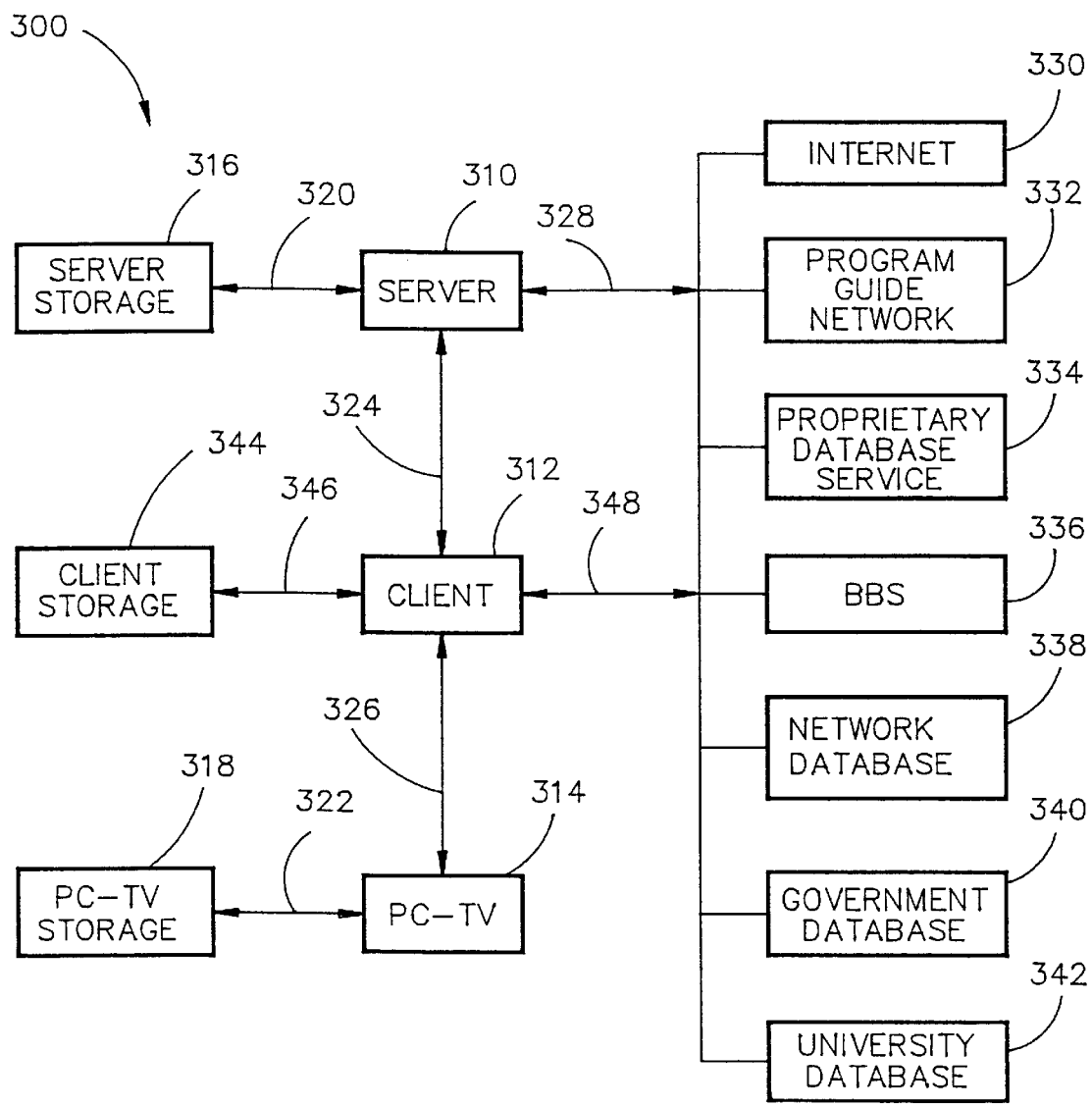
FIG. 3 is a conceptual block diagram of a typical network in accordance with the present invention.

Referring now to FIG. 3, a typical network in accordance with the present invention is shown. The network 300 comprises a server computer 310, a client computer 312, and a PC-TV convergence device 314. The server 310 typically includes a storage medium 316 connected via bus 320 for short or long term caching of information. Likewise, the client computer 312 and the PC-TV 314 each may include storage media 344 and 318 connected via buses 346 and 322, respectively, also for providing short or long term information storage.

In operation, the user may request information in the form of an electronic program guide from the PC-TV device 314. The electronic program guide contains programming information requested from a user for television, cable or network type programs. The client computer 312 may be located in a local service provider facility such as a cable company or Internet service provider (ISP) within the local jurisdiction of the user. In this case, the server computer may be located in a central facility of the cable company or within the facility of a programming guide company which may be located in another jurisdiction, for example. In any event, the request may be initiated from the PC-TV appliance 314 and electronically communicated via a communications network 326 to the client computer 312, which in turn may communicate with the server 310 via communications network 324. Alternatively, the user may communicate directly with the server 310 in which case the PC-TV 214 functions as the client computer 318.

After the request for programming information is received by the appropriate computer, the client 312 or the server 310, an information search is performed to obtain information relevant to the requested electronic programming information via communications network such as networks 328 or 348 shown. Thus, a search for information may be performed on the Internet 330, a commercial program guide network 332, a proprietary database service 334, a computer bulletin board service 336, a television network database 330, a government database 340, or a public database such as a university or library database 342, for example. Other similar type databases may be searched as well.

The electronic program guide contains programming information requested from a user for television, cable or network type programs. The database search is based upon the requested programming information, and upon the profile of the viewer. The requested programming information may be specific to each individual requesting user to increase the likelihood that the search obtains information in which the particular user is interested. The search may be a function of the programming information itself, such as the type and content of the programming information requested by the user and the time of day during which the requested information is to be viewed. Further, the search may be a function of user specific information which the user himself or herself has provided, for example in a survey, including demographic information (age, income, interests, hobbies, home state, etc.). The user may further specify what types of databases may or may not be covered by the search. As an example, the user may be aware that information received from a television network database 338 is likely to be promotional in nature, in which case he may exclude those types of databases from the search. Also, there may be additional charges for access to certain types of databases such as a proprietary database 334, so the user may choose to forego searching such types of databases.

When the search is performed, the search may be based upon viewer specific criteria to obtain only information which is likely to be specific and relevant to the particular requesting viewer by utilization of specific search criteria, for example using Boolean logic and operators. Further information limiting tactics may be employed to obtain only viewer specific information. For example, the search engine may use meta-tag information provided in the hypertext markup language (HTML) code provided in World Wide Web pages. The search result information may be further filtered by software programs running on the sever 310, client 312, or PC-TV 314 subsequent to downloading and storing in a local storage device.

The software system necessary to implement this may include a server based Internet meta-search engine and database manipulation algorithms. The meta-search engine would be responsible for conducting the actual search of Internet or other database information, the database manipulation algorithms would be responsible for data reduction and merging the search results with the originally requested programming content of the electronic program guide.

The results of the database search may be cached in the appropriate server storage device 316 or client storage device 344. When the electronic program guide is downloaded to the client computer 312 or the PC-TV device 314, the results of the database search are attached to the programming information contained within the electronic program guide as requested by the viewer. The viewer may immediately view the programming information and search results if applicable with the electronic program guide, or the results may be cached in the PC-TV storage device 318 for retrieval at a convenient time.

Figure 4:
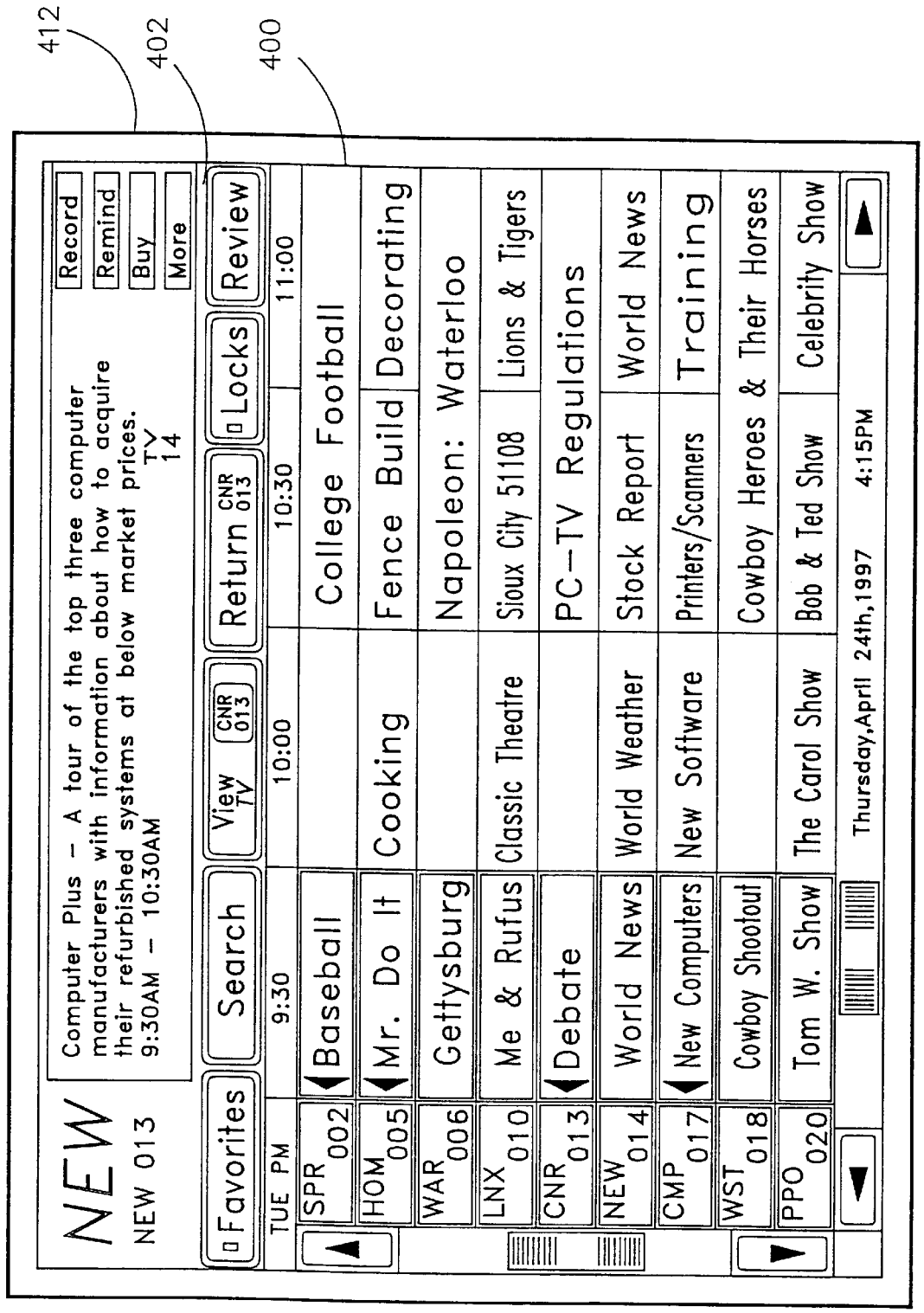
FIG. 4 is an illustration of a typical electronic program guide in accordance with the present invention.

Referring now to FIG. 4, a typical electronic program guide in accordance with the present invention is shown. The electronic program guide 400 may be displayed on the display 212 of the PC-TV 200 as shown in FIG. 2 using an appropriate video driver output device. The program guide 400 may be displayed on the display 412 via a viewer interface program 402 running on the personal computer 210 of the PC-TV appliance 200. As shown in FIG. 4, the program guide includes channel, program, and time such as in a matrix format for a particular day. The viewer may have requested information for programs playing only for a given time frame based upon his available viewing time. Further, the viewer may have requested information relating only for channels that he or she is likely to watch. If the viewer has an interest in more information for a particular program, he may utilize the viewer interface to select that specific program, for example by clicking in the program listing by using the viewer control device 214 of FIG. 2. Similarly, the viewer may highlight one or more programs for which more information is requested. Upon selection of a program or programs, information from the database search results that was appended to the electronic program guide may be displayed. The information may be displayed on a new page in the interface program 402 or may be displayed in a new window on the display, for example. Alternatively, the viewer may select to view all of the downloaded database search results in their entirety.

Figure 5:
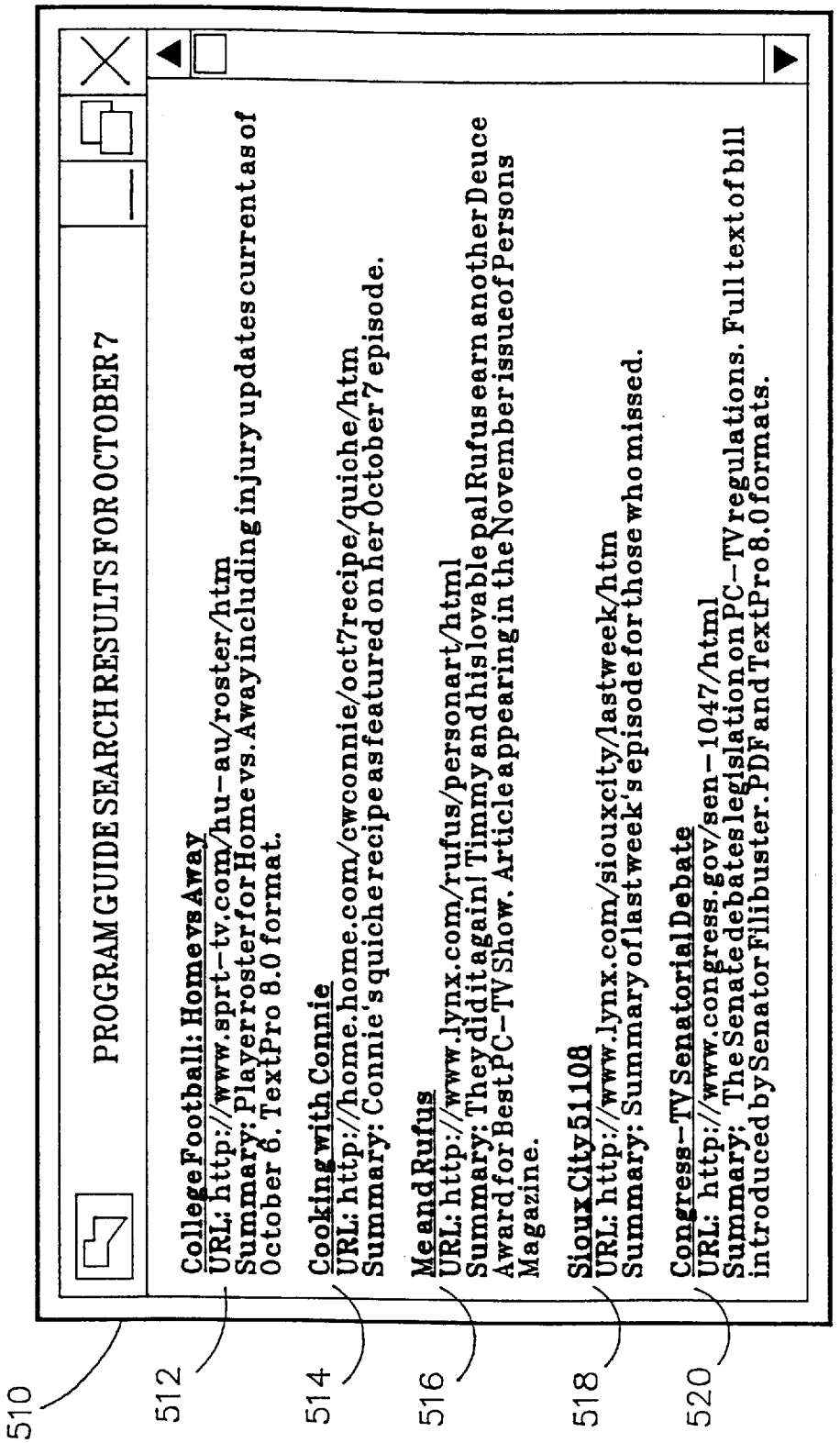
FIG. 5 is an illustration of database search results in accordance with the present invention.

Referring now to FIG. 5, database search results in accordance with the present invention shown. The program guide search results display the title of the program selected. The selection may have been made by the viewer by highlighting specific programs on the electronic program guide as shown in FIG. 4, or the selection may have been made by the database search engine itself As shown in FIG. 5, the database search results provide the title of the show, the uniform resource locator (URL) which provides the specification for locating information on the Internet, and a summary of the obtained information. The viewer may select to view information that appears to be relevant or interesting to him or her, and which may enhance or supplement the viewing experience. For example, if the viewer desires to watch the Home vs. Away football game, he may view the player roster for the teams and be updated on player injuries 512. The player roster information may be further available in a word processor format, for example, and the viewer may choose to print out a hard copy of the information if he or she has the same or compatible type of word processor. The viewer may wish to obtain a copy of the recipe featured on a cooking program 514 which is available to be viewed at his or her leisure without having to worry about transcribing the recipe while viewing the program. Also, the viewer may wish to read a magazine article pertaining his or her favorite show 516, or may read a summary of a previous week's episode to be updated on missed shows 518. Further, the viewer may wish to participate in the political process by viewing a congressional debate. In order to help understand the debate, the text of a debated bill 520 may be available for viewing or to be downloaded by the viewer in a particular format such as a graphical document format or word processor text format. Thus, the database search results provide current, viewer specific information that may augment his or her personal viewing experience.

Figure 6:
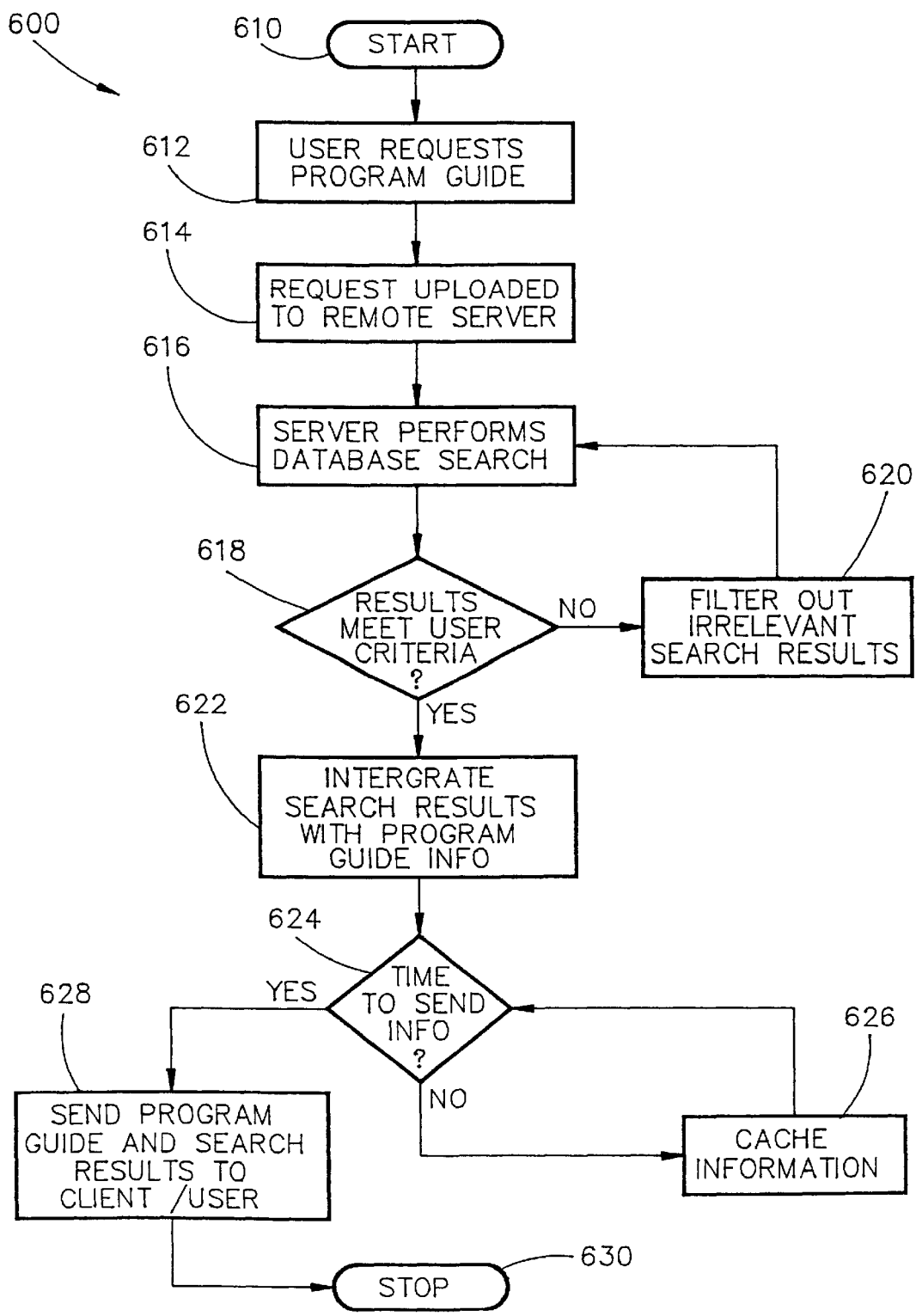
FIG. 6 is a flow diagram of the method of the present invention.

Referring now to FIG. 6, a flow diagram of the method of the present invention is shown. At the start 610 of the method 600, the viewer provides the initial request for the electronic program guide 612. Electronic program guide 612 contains programming information for television, cable or network programming or the like. The request information is uploaded from the viewer's computer, either a PC-TV convergence device or a client computer, to the remote server for processing of the program guide request 614. Upon receiving the program guide request, the server performs a database search 616 as described with respect to FIG. 3. A decision branch in the method determines whether or not the search results meet the viewer criteria as determined from the requested program information 618. If the search results contain search results which are irrelevant to the viewer, the irrelevant search results are filtered out of the overall search results and discarded 620, and the server continues to perform a database search 616 until a sufficient amount of relevant information is obtained or until a predetermined time has elapsed (i.e. a "time out") if no relevant information is found. The results of the database search are appended to or integrated with the program guide information 622. A determination is made whether it is the correct time at which to send the program guide 624. If it is not the appropriate time to send the program guide, then the program guide and database search results information is stored in cache storage medium 626. Upon reaching the appropriate time, the program guide and data search result information is sent to the client or viewer 628, upon which the method terminates 630.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the viewer. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method for delivering and caching preprocessed search results to improve performance of background information searches on a convergence device of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for delivering data base search results in conjunction with an information request, the method comprising:
   receiving a request for information from a remote device, the information containing predetermined content;
   performing a search of a database based upon the predetermined content of the information whereby a database search result is obtained; and
   determining whether a time period has been reached, wherein if the time period is not reached, storing the database search result and if the time is reached, delivering the database search result and the information to the remote device.

2. A method as claimed in claim 1, further comprising the steps of determining the relevancy of the database search result to the predetermined content; upon the database search result being irrelevant, discarding the database search result, and repeating said performing step.

3. A method as claimed in claim 1, further comprising the steps of determining the relevancy of the database search result to the predetermined content; and, upon the data base search result being relevant, implementing said delivering step.

4. A method as claimed in claim 1, further comprising the step of obtaining the information from an information source.

5. A method as claimed in claim 1, further comprising the steps of obtaining the information and merging the database search result with the information.

6. A method as claimed in claim 1, further comprising the steps of determining the proper time to send the database search result, and sending the search result to the remote device at the proper time.

7. A method as claimed in claim 1, further comprising the steps of determining the proper time to deliver the database search result, storing the database search result until the proper time is reached, and implementing said delivering step at the proper time.

8. A method as claimed in claim 1, wherein said performing step includes performing multiple searches of one or more databases based upon the predetermined content.

9. A method as claimed in claim 1, further comprising the step of storing the database search result for subsequent retrieval.

10. A method as claimed in claim 1, wherein said delivering step includes delivering the database search result to the remote device.

11. A method as claimed in claim 1, wherein said delivering step includes delivering the database search result along with the information to the remote device.

12. A method as claimed in claim 1, wherein said delivering step includes concurrently delivering the database search result and the information to the remote device.

13. A method as claimed in claim 1, further comprising the step of displaying the database search result and the information on a user interface.

14. A method as claimed in claim 1, further comprising the step of storing the database search result in the remote device.

15. A method as claimed in claim 1, further comprising the step of retrieving the data base search result from the remote device.

16. A method as claimed in claim 1, wherein said performing step includes performing a metatag based search.

17. A method as claimed in claim 1, wherein said delivering step includes the step of delivering the database search result and the information to a personal computer and television convergence device.

18. A method as claimed in claim 1, further comprising the step of updating the database search result.

19. A method as claimed in claim 1, wherein the remote device is a computer based information handling system.

20. A method as claimed in claim 1, further comprising the step of concurrently displaying the database search result and the information on a user interface.

21. A computer readable medium whose contents cause a computer to perform method steps for delivering data base search results in conjunction with an information request, the method steps comprising:
   receiving a request for information from a remote device, the information containing predetermined content;
   performing a search of a database based upon the predetermined content of the information whereby a database search result is obtained; and
   determining whether a time period has been reached, wherein if the time period is not reached, storing the database search result, and if the time is reached, delivering the database search result and the information to the remote device.

22. A computer readable medium as claimed in claim 21, the method steps further comprising the step of determining the relevancy of the database search result to the predetermined content wherein the database search result is discarded and said performing step is repeated if the database search result is irrelevant.

23. A computer readable medium as claimed in claim 21, the method steps further comprising the step of determining the relevancy of the database search result to the predetermined content wherein said delivering step is implemented if the data base search result is relevant.

24. A computer readable medium as claimed in claim 21, the method steps further comprising the step of obtaining the information from a source thereof.

25. A computer readable medium as claimed in claim 21, the method steps further comprising the step of obtaining the information and merging the database search result with the information.

26. A computer readable medium as claimed in claim 21, the method steps further comprising the steps of determining the proper time to send the database search result and sending the search result to the remote device at the proper time.

27. A computer readable medium as claimed in claim 21, wherein said performing step includes performing multiple searches of one or more databases based upon the predetermined content.

28. A computer readable medium as claimed in claim 21, the method steps further comprising the step of storing the database search result for subsequent retrieval.

29. A computer readable medium as claimed in claim 21, wherein said delivering step includes delivering selected database search result into the remote device.

30. A computer readable medium as claimed in claim 21, wherein said delivering step includes delivering the database search result along with the information to the remote device.

31. A computer readable medium as claimed in claim 21, wherein said delivering step includes concurrently delivering the database search result and the information to the remote device.

32. A computer readable medium as claimed in claim 21, the method steps further comprising the step of displaying the database search result and the information on a us er interface.

33. A computer readable medium as claimed in claim 21, the method steps further comprising the step of storing the database search result in the remote device.

34. A computer readable medium as claimed in claim 21, the method steps further comprising the step of selectively retrieving the data base search result from the remote device.

35. A computer readable medium as claimed in claim 21, wherein said performing step includes performing a metatag based search.

36. A computer readable medium as claimed in claim 21, wherein the remote device is a personal computer and television convergence device.

37. A computer readable medium as claimed in claim 21, the method steps further comprising the step of updating the database search result.

38. A computer readable medium as claimed in claim 21, wherein the remote device is a computer based information handling system.

39. A computer readable medium as claimed in claim 21, further comprising the step of concurrently displaying the database search result and the information on a user interface.

40. An information handling system for delivering data base search results in conjunction with an information request, comprising:
    means for receiving a request for information from a remote device, the information containing predetermined content;
    means for performing a search of a database based upon the predetermined content of the information whereby a database search result is obtained;
    means for determining whether a time period has been reached, wherein if the time period is not reached, storing the database search result, and if the time period is reached, delivering that database search result and the information; and
    means for delivering the database search result and the information to the remote device.

41. An information handling system as claimed in claim 40, further comprising means for determining the relevancy of the database search result to the predetermined content wherein the database search result is discarded and said performing means is activated if the database search result is irrelevant.

42. An information handling system as claimed in claim 40 further comprising means for determining the relevancy of the database search result to the predetermined content wherein said delivering means is activated if the data base search result is relevant.

43. An information handling system as claimed in claim 40, further comprising means for obtaining the information from a source thereof.

44. An information handling system as claimed in claim 40, further comprising means for obtaining the information and merging the database search result with the information.

45. An information handling system as claimed in claim 40, further comprising means for determining the proper time to send the database search result and for sending the search result to the remote device at the proper time.

46. An information handling system as claimed in claim 40, wherein said performing means includes means for performing multiple searches of one or more databases based upon the predetermined content.

47. An information handling system as claimed in claim 40, further comprising means for storing the database search result for subsequent retrieval.

48. An information handling system as claimed in claim 40, wherein said delivering means includes means for delivering selected database search result into the remote device.

49. An information handling system as claimed in claim 40, wherein said delivering means includes means for delivering the database search result along with the information to the remote device.

50. An information handling system as claimed in claim 40, wherein said delivering means includes concurrently means for delivering the database search result and the information to the remote device.

51. An information handling system as claimed in claim 40, further comprising means for displaying the database search result and the information on a user interface.

52. An information handling system as claimed in claim 40, further comprising means for storing the database search result in the remote device.

53. An information handling system as claimed in claim 40, further comprising means for selectively retrieving the database search result from the remote device.

54. An information handling system as claimed in claim 40, wherein said performing means includes means for performing a metatag based search.

55. An information handling system as claimed in claim 40, wherein the remote device is a personal computer and television convergence device.

56. An information handling system as claimed in claim 40, further comprising means for updating the database search result.

57. An information handling system as claimed in claim 40, wherein the remote device is a computer based information handling system.

58. An information handling system as claimed in claim 40, further comprising means for concurrently displaying the database search result and the information on a user interface.

59. An information handling system for delivering data base search results in conjunction with an information request, comprising:
    a server for receiving a request for information from a remote device, the information containing predetermined content;
    a search engine operating on said server for performing a search of a database based upon the predetermined content of the information whereby a database search result is obtained and determining if a time period has been reached, wherein if the time period is not reached, storing the database search result, and if the time period is reached, delivering that database search result and the information; and
    a network for delivering the database search result and the information to the remote device.

60. An information handling system as claimed in claim 59, wherein said search engine is adapted for performing multiple searches of one or more databases based upon the predetermined content.

61. An information handling system as claimed in claim 59, further comprising a storage medium coupled to said server for storing the database search result for subsequent retrieval.

62. An information handling system as claimed in claim 59, further comprising a storage medium coupled to the remote device for storing the database search result.

63. An information handling system as claimed in claim 59, wherein said search engine is a metatag search engine.

64. An information handling system as claimed in claim 59, wherein the remote device is a personal computer and television convergence device.

* * * * *